United States Patent [19]
Eberle et al.

[11] Patent Number: 4,725,191
[45] Date of Patent: Feb. 16, 1988

[54] INDUSTRIAL ROBOT ASSEMBLY

[75] Inventors: Manfred Eberle, Erlangen; Rainer Keppler, Baiersdorf; Bernd Köslich, Herzogenaurach-Niederndorf, all of Fed. Rep. of Germany

[73] Assignee: Manutec Gesellschaft für Automatisierungs- Und Handhabungssysteme GmbH, Fürth, Fed. Rep. of Germany

[21] Appl. No.: 852,334

[22] Filed: Apr. 15, 1986

[30] Foreign Application Priority Data

Apr. 16, 1985 [DE] Fed. Rep. of Germany ....... 3513705

[51] Int. Cl.$^4$ ............................................. B25J 9/06
[52] U.S. Cl. .................................. 414/744 A; 901/15; 901/21; 901/23; 901/25
[58] Field of Search ............... 414/744 R, 744 A, 735; 901/21, 23, 24, 25, 15, 17

[56] References Cited

U.S. PATENT DOCUMENTS

| | | | |
|---|---|---|---|
| 4,348,142 | 9/1982 | Figour | 414/2 |
| 4,398,720 | 8/1983 | Jones et al. | 901/15 X |
| 4,527,945 | 7/1985 | Passemard et al. | 414/735 |
| 4,568,238 | 2/1986 | Hirano et al. | 901/23 X |

FOREIGN PATENT DOCUMENTS 1148721 5/1963 Fed. Rep. of Germany .
112789 8/1980 Japan .................................... 901/17

Primary Examiner—Robert J. Spar
Assistant Examiner—Donald W. Underwood
Attorney, Agent, or Firm—Kenyon & Kenyon

[57] ABSTRACT

An industrial robot assembly comprises a support body including a stationary portion and a vertically translatable portion. A tapered arm member is mounted to the translatable portion of the support for rotation about a first vertically oriented axis, and an angle lever is mounted to the tapered arm member at a point spaced from the first axis for rotation about a second axis parallel to and spaced from the first axis. A first electric motor is operatively connected to the arm member for rotating that member about the first axis, while a second electric motor is operatively connected to the angle lever for rotating that lever about the second axis. A translatable and rotatably component for carrying grippers or another workpiece-manipulating element is mounted to the angle lever at a point spaced from the second axis. A third electric motor and a lifting drive are operatively coupled to the holder component for translating the component and for rotating that component about a third axis, respectively. The electric motors are all mounted to the arm member, the lifting drive being mounted to the angle lever.

7 Claims, 5 Drawing Figures

INDUSTRIAL ROBOT ASSEMBLY

BACKGROUND OF THE INVENTION

This invention relates to an industrial robot assembly. More particularly, this invention relates to a robot assembly having two relatively rotatable arm members coupled to one another and further having electric motors with associated transmissions for driving the arm members about rotation axes.

U.S. Pat. No. 4,348,142 discloses in FIG. 1 two arm members coupled to one another by a rotary joint, the arm members being relatively rotatable in the same horizontal plane. For driving such a pair of arm members about a rotary joint, electric motors with gear type transmissions are frequently integrated into the joint, as disclosed in German Patent Document (Auslegeschrift) No. 11 48 721. By arranging the electric motors at the rotary joints, very fast and precise movements are obtainable. However, moments of inertia are generally increased inasmuch as the drive motors are located at the tips of the arm members, i.e., at points located at maximum distances from a primary axis of rotation.

An object of the present invention is to provide an improved robot assembly of the above-described type.

Another, more particular, object of the present invention is to provide such a robot assembly having a fast and precise drive for each of the individual arm members and simultaneously having reduced moments of inertia.

SUMMARY OF THE INVENTION

An industrial robot assembly comprises, in accordance with the present invention, a support, a first arm member mounted to the support for rotation about a first axis, and a second arm member mounted to the first arm member for rotation about a second axis parallel to and spaced from the first axis. The second arm member is mounted in a fork-like extension of the first arm member spaced from the first axis. A first drive including a first electric motor and an associated transmission both mounted to the first arm member is provided for rotating the first arm member about the first axis. The motor has an axis of rotor rotation oriented parallel to the first axis. The first drive further includes a first pinion meshing with a first gear rigidly attached to the support.

A second drive is operatively connected to the second arm member for rotating that member about the second axis. The second drive means includes a second electric motor and an associated transmission both mounted to the first arm member, the second electric motor having an axis of rotor rotation oriented parallel to the first axis and the second axis. The second drive further includes a second pinion meshing with a second gear, the second gear being drivingly connected to the second arm member by at least one driver element spaced from an axis of rotation of the second gear. A holder is mounted to the second arm member at a point spaced from the second axis for carrying means for operating on a workpiece.

The robot assembly in accordance with the present invention further comprises a third drive for rotating a component of the holder about a third axis. The third drive includes a third electric motor mounted to the first arm member and further includes a serrated power transmission belt coupled to the holder component for transmitting rotary power thereto.

Preferably, the first axis is located at one end of the first arm member and the second axis is located at an opposite end of the first arm member. In addition, the second arm member is mounted to the first arm member at the second axis and the holder is mounted to the second arm member at an end thereof spaced from the second axis. In a preferred embodiment of the invention, the first axis and the second axis are vertical axes.

Pursuant to additional particular features of the present invention, the support includes a movable component translatable in a direction parallel to the first axis and the first arm member is rotatably mounted to that movable component, whereby the first arm member, the second arm member and the holder are shiftable parallel to the first axis.

DETAILED DESCRIPTION

Figure 1:
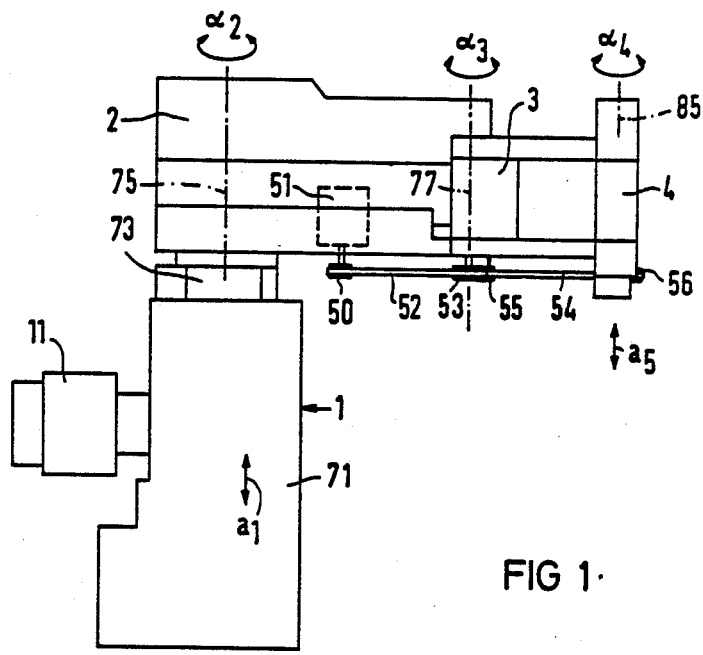
FIG. 1 is a schematic side elevational view of an industrial robot assembly in accordance with the present invention, showing a pair of relatively rotatable arm members coupled to one another at a rotary joint and further showing a holder component at a free end of one of the arm members.

As illustrated in FIG. 1, an industrial robot assembly comprises a support body 1 having a stationary portion 71 and a vertically translatable lifting portion 73. A motor 11 fixed to stationary portion 71 is operatively connected to lifting portion 73 for shifting the same alternately upwardly and downwardly, as indicated by an arrow $a_1$. A first arm member 2 is rotatably mounted to lifting member 73 for limited pivotal motion through an angle $a_2$ about a first vertically oriented rotation axis 75. This pivoting or swinging motion of arm 2 about axis 75 is implemented by an electric motor 21 (see FIGS. 2 and 4) mounted to arm 2.

Another arm member 3 is rotatably mounted to an end of arm member 2 opposite rotation axis 75. Arm member 3 is limitedly pivotable through an angle $a_3$ about another vertically oriented rotation axis 77. The pivoting of arm 3 about axis 77 is accomplished by an electric motor 31 (see FIGS. 2 and 4) mounted to arm 2.

Figure 2:
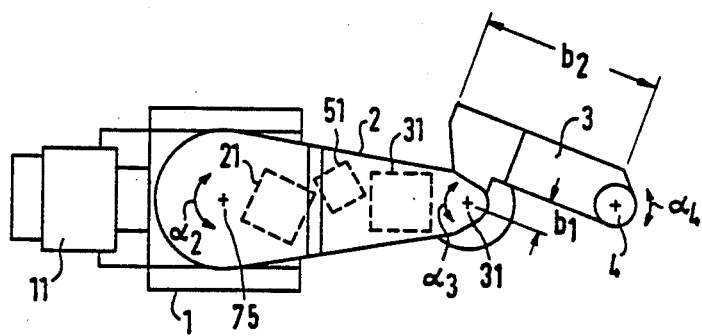
FIG. 2 is a schematic top view of the robot assembly illustrated in FIG. 1.
Figure 3:
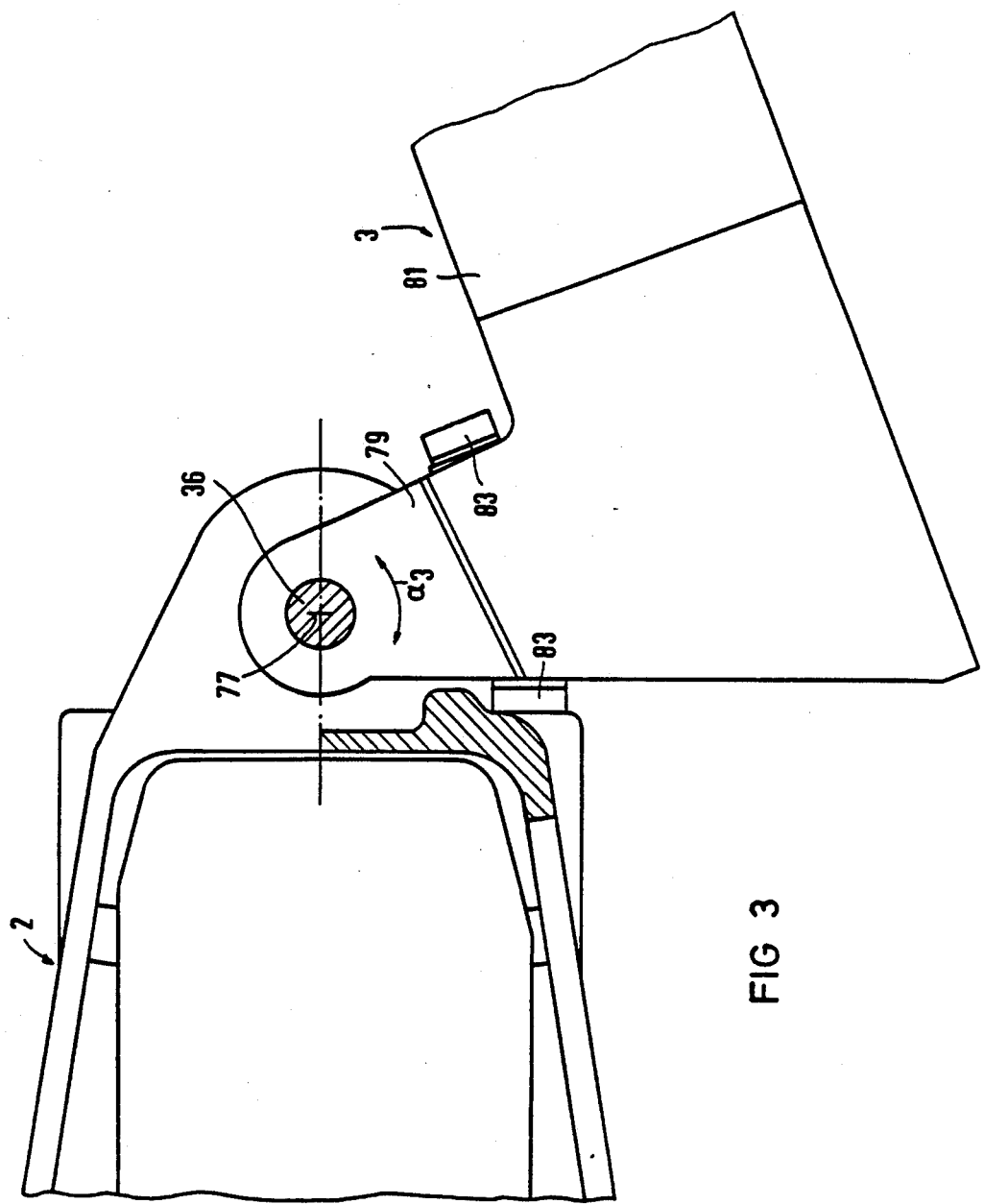
FIG. 3 is a partial schematic top view of the arm members of FIG. 1, partially in cross section and on an enlarged scale.

As illustrated in FIGS. 2 and 3, arm member 3 takes the form of an angle lever having a short portion 79 disposed at an angle of preferably 90° with respect to a long portion 81 of the angle lever. Short portion 79 and long portion 81 of angle lever 3 have respective lengths $b_1$ and $b_2$, these lengths advantageously having a ratio between 1:3 and 1:8 and preferably approximately 1:6. A free end of short portion 79 of angle lever 3 is mounted in a fork-like extension 37 (see FIG. 4) of arm member 2 via a shaft 36 having rotation axis 77 as an axis of symmetry.

Owing to the angular design of angle lever 3 and a tapered or conical shape of arm member 2 (FIG. 2), it is possible to rotate the arm members 2 and 3 relative to one another so that long portion 81 (FIG. 3) is approximately parallel to arm member 2. The relative motion of arm members 2 and 3 is limited by buffer elements 83.

At a free end of long portion 81 of angle lever 3, i.e., at an end of angle lever 3 opposite axis 77 and short portion 79, is disposed a holder 4 for carrying grippers, a screwdriver or other element for performing an operation on a workpiece in an industrial process. Holder 4 has a component 3 (see FIG. 5) which is vertically reciprocatable, as indicated by an arrow $a_5$ in FIG. 1, and rotatable or pivotable through an angle $\alpha_4$ about a rotation axis 85 oriented parallel to axes 75 and 77. Both arm members 2 and 3 and actuator 4 are vertically movable by lifting portion 73 of pedestal-like support body 1.

Figure 4:
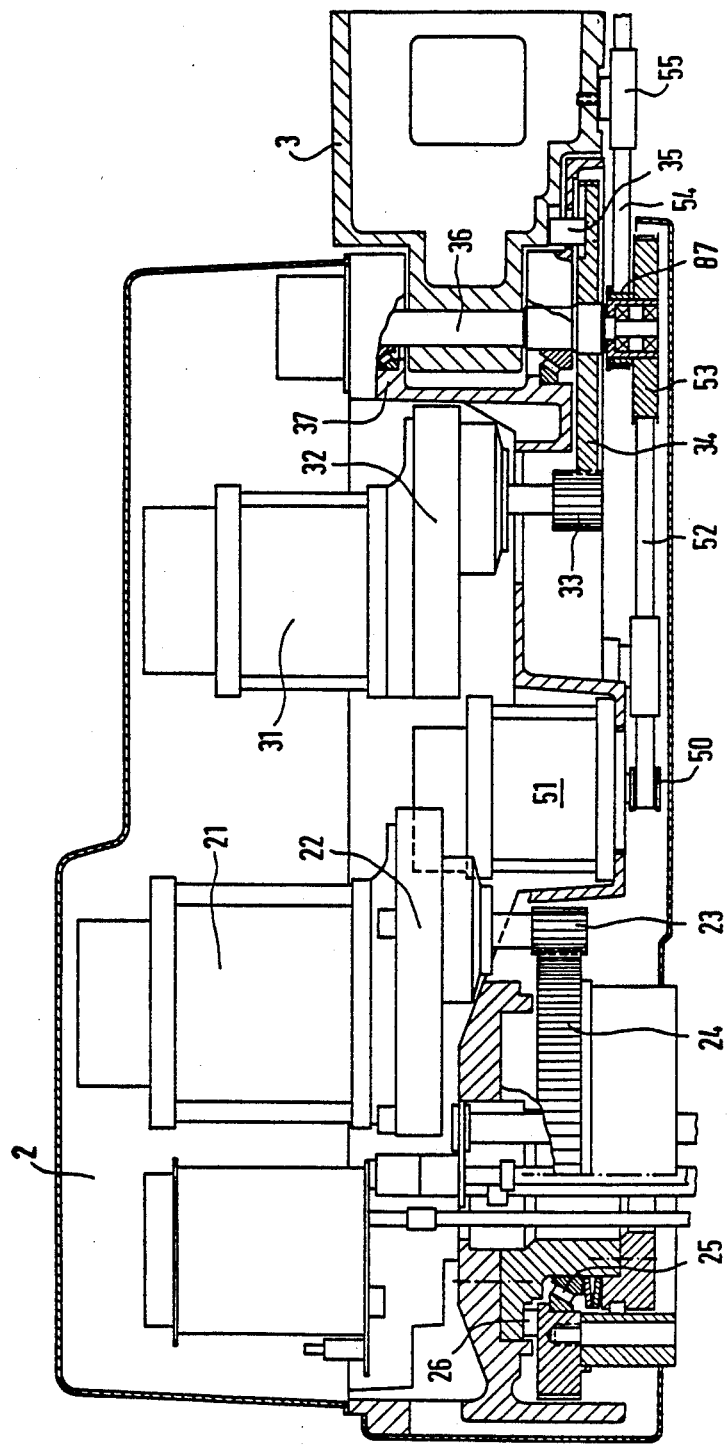
FIG. 4 is a longitudinal, partially schematic, cross-sectional view through one of the arm members and through a portion of the other arm member.

As shown in FIG. 4, arm member 2, as well as angle lever 3 and holder 4, is rotatably supported on lifting portion 73 (not illustrated in FIG. 4) by means of a conical roller bearing 25 and a needle bearing 26. To lifting portion 73 is fixed a gear 24 which meshes with a pinion 23 driven by electric motor 21 via a transmission 22. Motor 21, transmission 22, pinion 23 and gear 24 collectively serve as a drive for rotating arm member 2 (and angle lever 3 and actuator 4) about axis 75.

Motor 31 rotatably drives a pinion 33 via a transmission 32, pinion 33 meshing with a gear 34 mounted to arm member 2 for rotation about axis 77. Rotary motion of gear 34 is converted into a pivoting motion of angle lever 3 via at least one driver dog 35 exemplarily fixed to angle lever 3 and slidably engaging walls of a slot in gear 34.

Motors 21 and 31, as well as a third electric motor 51 mounted to arm member 2, each have a vertically extending axis of rotor rotation. As illustrated in FIGS. 1 and 4, a serrated endless belt 52 couples a pulley 50 at the output of drive motor 51 with another pulley 53 which is mounted on a bottom side of arm member 2 for rotation about axis 77. Another pulley 87 fixed to pulley 53 is coupled via another serrated endless belt 54 to a driven pulley 56 at holder 4. The direction of extension of belt 54 is conformed to the shape of angle lever 3 by means of an idler pulley 55 mounted to lever 3.

The disposition of the drive motors, particularly motors 31 and 51, within or on arm member 2 and relatively close to axis 75 serves to provide a reduced moment of inertia. This configuration of the drive motors also enables a reduction in the size of arm members such as angle lever 3 connected at the free end of the first arm member 2, thereby reducing the space required for the robot assembly and facilitating automatic operations under crowded conditions.

Figure 5:
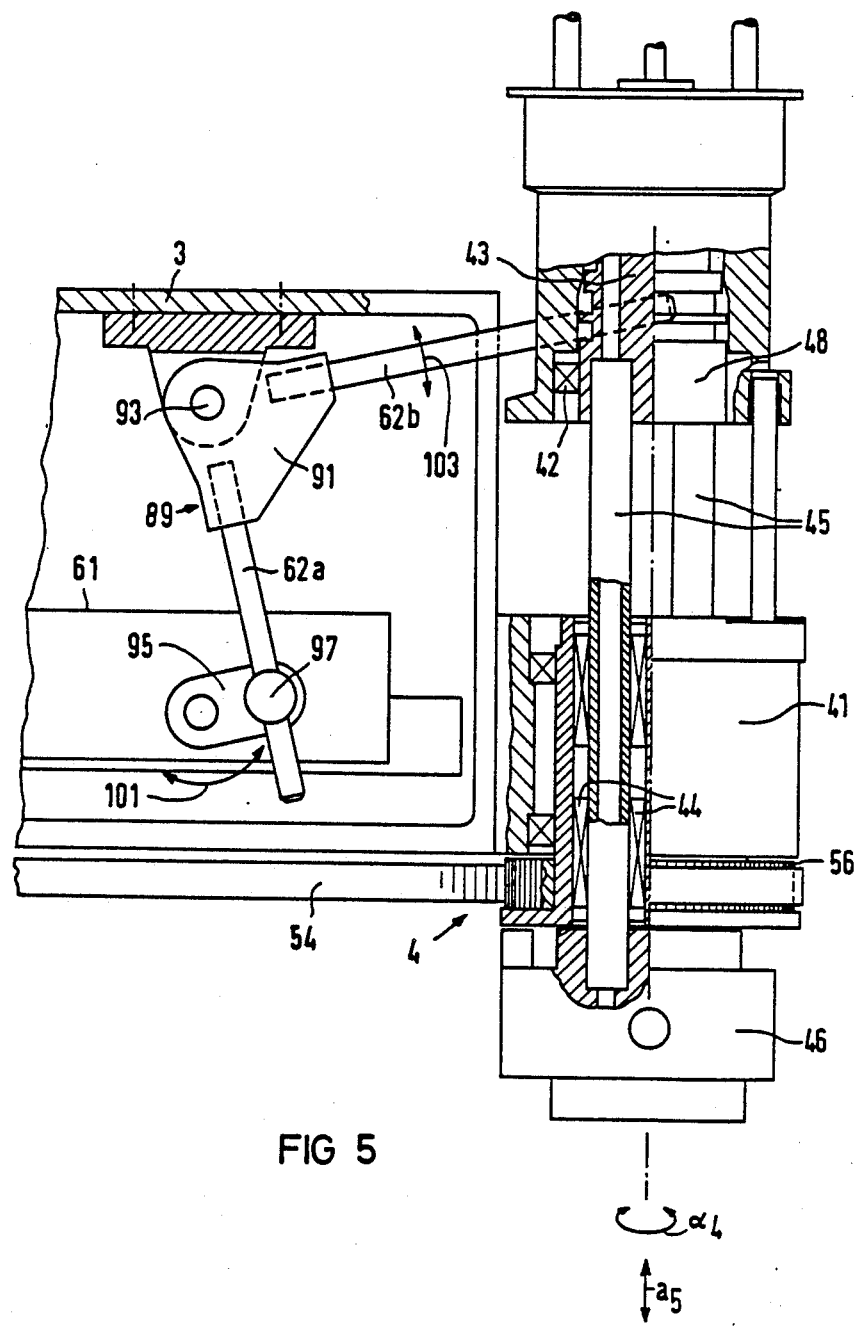
FIG. 5 is a partially schematic cross-sectional view of the holder component and a portion of one of the arm members of FIG. 1.

As illustrated in FIG. 5, holder member 4 comprises a carrier 41 to which a lifting part 48 is shiftably mounted via ball sleeves 44 for alternating upward and downward motion, as indicated by arrow $a_5$. Lifting part 48 includes guide tubes 45 and an end plate 46. Component 43 is rotatably mounted to lifting part 48 by means of bearings 42.

Rotatable component 43 is pivoted about axis 85 (FIG. 1) by rotary power transmitted from motor 51 via serrated belts 52 and 54. As shown in FIG. 5, serrated belt 54 engages pulley 56 about a portion of the circumference thereof, that pulley being rigidly connected to component 43 so that rotation of pulley 56 results in rotation of component 43.

Translation of part 48 is accomplished via a lever system 89 comprising a pair of lever arms 62a and 62b oriented at approximately 90° with respect to one another, each lever arm being fixed at one end to a bracket 91 rotatably and flexibly mounted to arm member 3 for rotation about a horizontal axis 93. Motion of lever system 89 about axis 93 is accomplished by a rotary pneumatic drive 61 having a pivotable output lever 95 coupled to lever arm 62a at a sliding joint 97. Rotary motion of output lever 95, as indicated by an arrow 101, results in rotary motion of lever system 89, as indicated by an arrow 103, and in a vertical shifting motion of lifting part 48 and rotatable component 43 attached thereto, as indicated by arrow $a_5$. In order to convert the rotary motion of lever system 89 into translation of lifting part 48, an end of lever arm opposite bracket 91 is slidably inserted in an eye or aperture in the lifting part.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to understood that the descriptions and illustrations herein are proferred by way example to facilitate comprehension of the invention and should not be construed to limit the scope thereof.

What is claimed is:

1. An industrial robot assembly comprising:
   a support;
   a first arm member mounted to said support for rotation about a first axis, said first arm member having a fork-like extension spaced from said first axis;
   first drive means for rotating said first arm member about said first axis, said first drive means including a first electric motor and an associated transmission both mounted to said first arm member, said first electric motor having an axis of rotor rotation oriented parallel to said first axis, said first drive means further including a first pinion meshing with a first gear rigidly attached to said support;
   a seond arm member having a first portion mounted to said first arm member in said fork-like extension for rotation about a second axis parallel to and spaced from said first axis, said second arm member having a second portion joined to said first portion at an end thereof opposite said second axis, said second portion extending at an angle with respect to said first portion, whereby said second arm member takes the form of an angle lever;
   second drive means operatively connected to said second arm member for rotating same about said second axis, said second drive means including a second electric motor and an associated transmission both mounted to said first arm member, said second electric motor having an axis of rotor rotation oriented parallel to said first and second axis, second drive means further including a second pinion meshing with a second gear, said second gear being mounted around said second axis and drivingly connected to said second arm member by at least one driver element spaced from an axis of rotation of said second gear;
   holder means mounted to said second arm member at a point spaced from said second axis for carrying means for operating on a workpiece; and
   third drive means for rotating a component of said holder means about a third axis, said third drive means including a third electric motor mounted to said first arm member and further including a serrated power transmission belt coupled to said component.

2. The robot assembly defined in claim 1 wherein said support includes a movable component translatable in a direction parallel to said first axis, said first arm member being rotatably mounted to said movable component, whereby said first arm member, said angle lever and said actuator means are shiftable parallel to said first axis.

3. The robot assembly defined in claim 2 wherein said first axis and said second axis are vertical axes.

4. The robot assembly defined in claim 2 wherein said first arm member has a first end spaced from said first axis and said angle lever has a second end spaced from said second axis, said fork-like extension being disposed at said first end, said holder means being mounted to said angle lever at said second end.

5. The robot assembly defined in claim 4 wherein said first axis is located at an end of said first arm member opposite said first end, said second axis being located at said first end.

6. The robot assembly defined in claim 1 wherein said support includes a movable component translatable in a direction parallel to said first axis, said first arm member being rotatably mounted to said movable component, whereby said first arm member, said second arm member and said holder means are shiftable parallel to said first axis.

7. The robot assembly defined in claim 1 wherein said first axis and said second axis are vertical axes.

* * * * *